March 14, 1944.  S. GRUBICH  2,344,246

MATERIAL DIGGING AND HANDLING APPARATUS

Filed April 22, 1942   5 Sheets-Sheet 1

INVENTOR.
STEPHEN GRUBICH.
BY
ATTORNEY

March 14, 1944.  S. GRUBICH  2,344,246
MATERIAL DIGGING AND HANDLING APPARATUS
Filed April 22, 1942   5 Sheets-Sheet 3
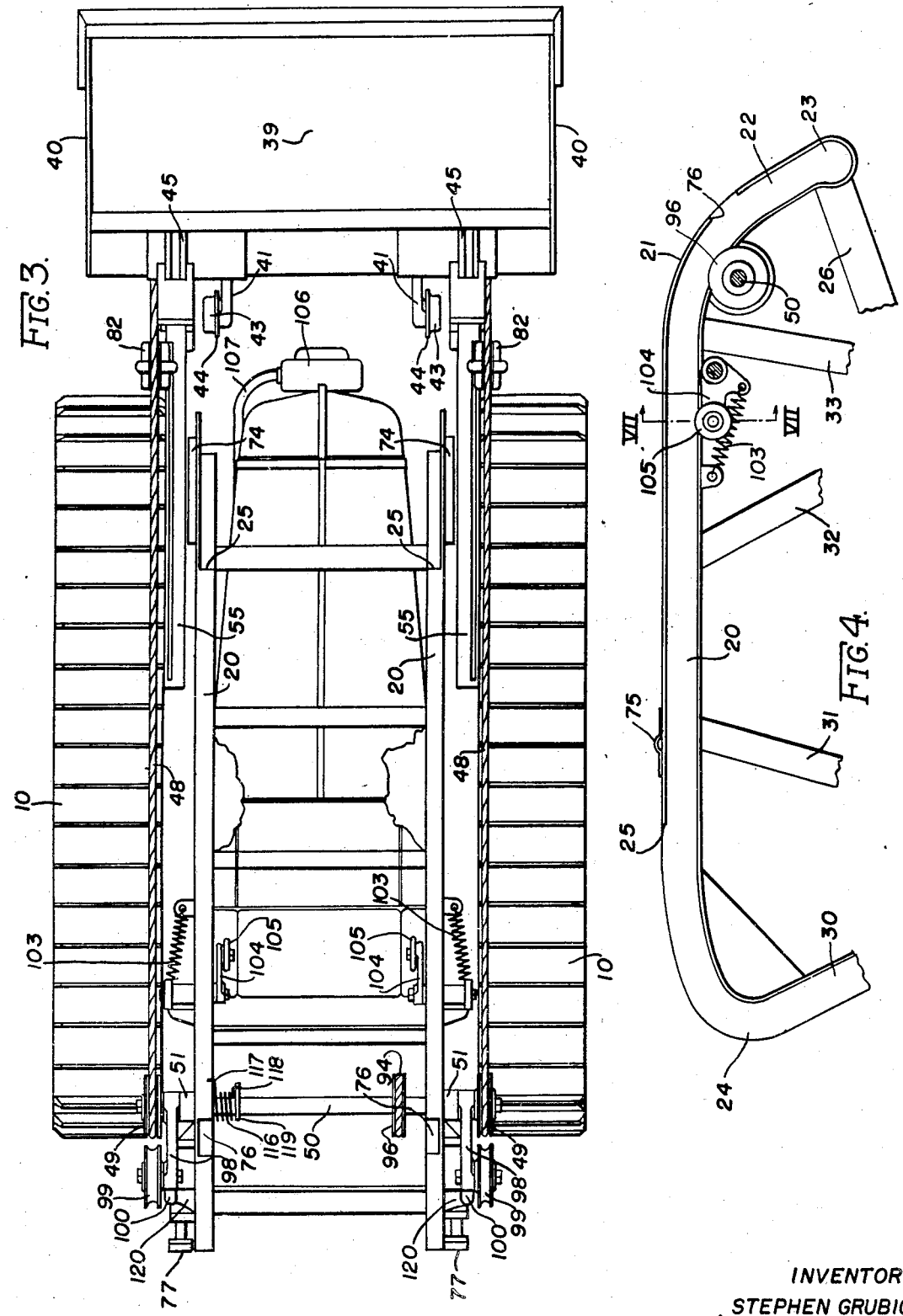
INVENTOR.
STEPHEN GRUBICH.
BY Harry C. Schmitz
ATTORNEY.

March 14, 1944.   S. GRUBICH   2,344,246
MATERIAL DIGGING AND HANDLING APPARATUS
Filed April 22, 1942   5 Sheets-Sheet 4
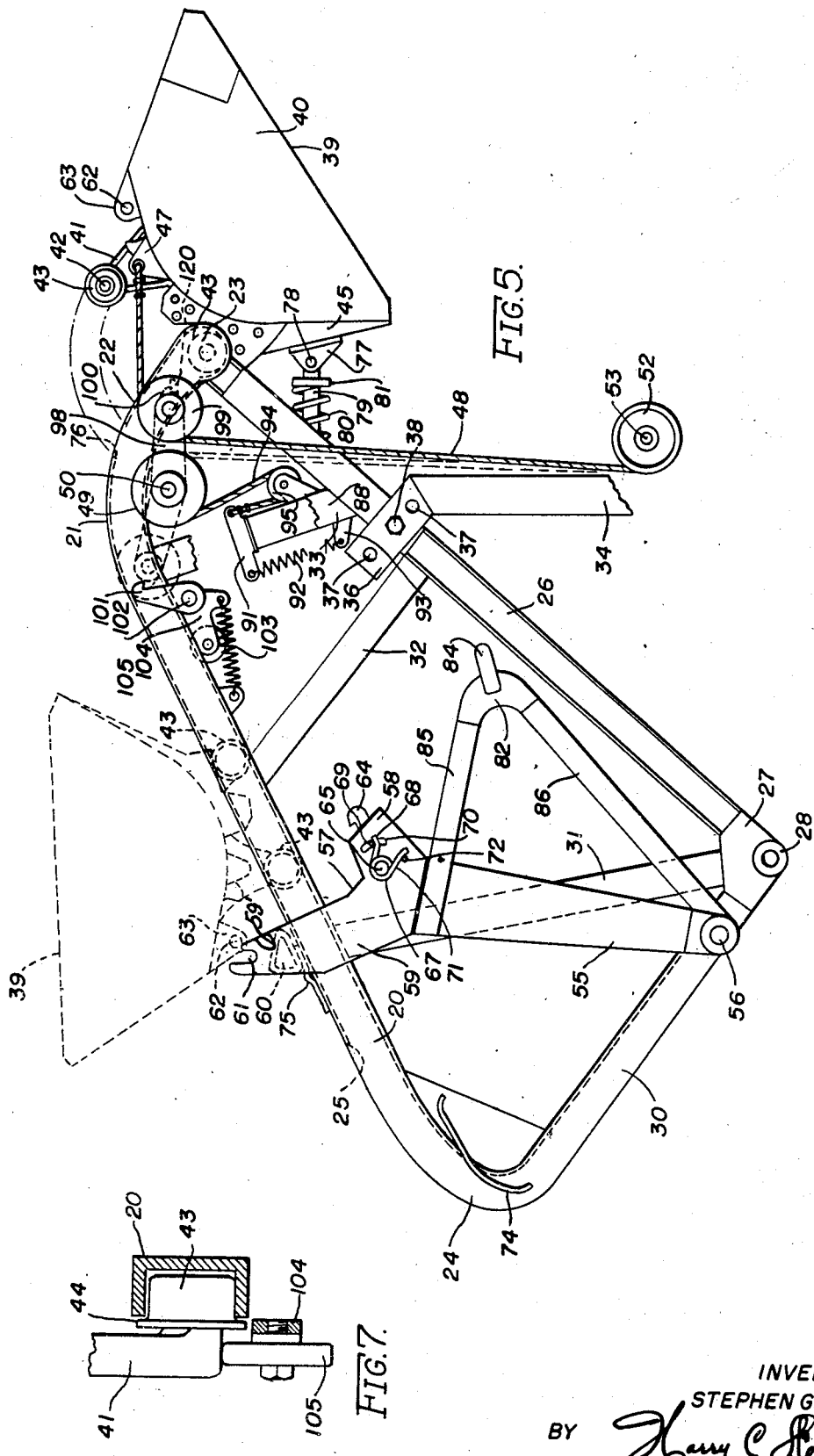
INVENTOR.
STEPHEN GRUBICH.
BY
ATTORNEY

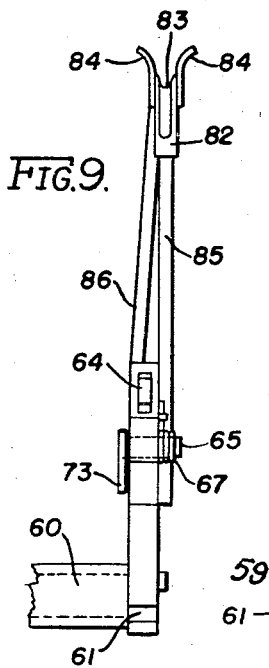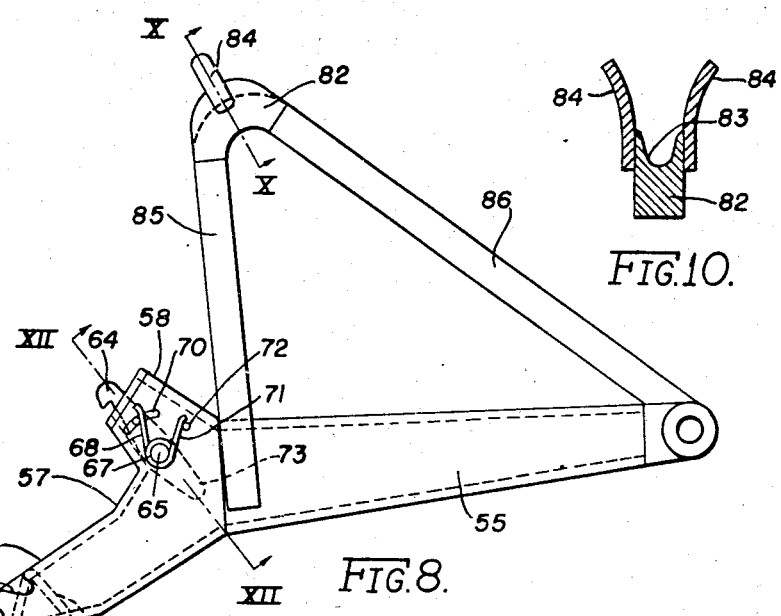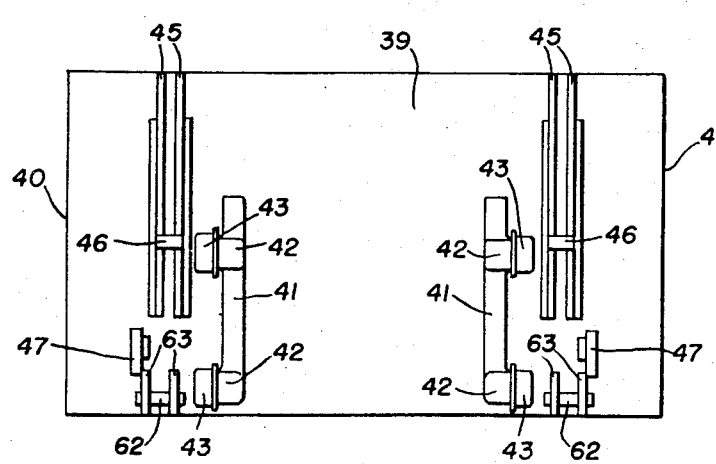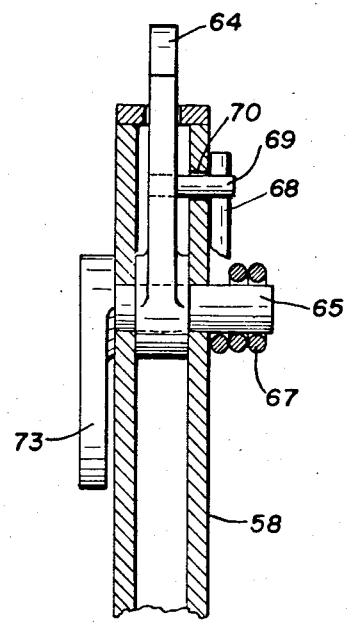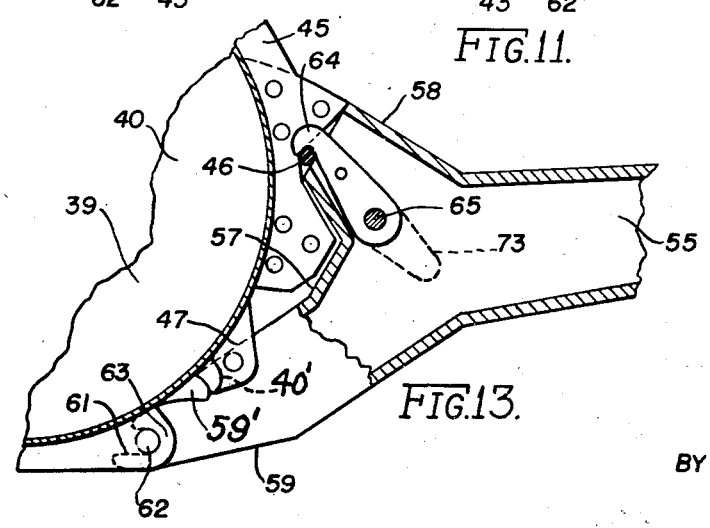

Patented Mar. 14, 1944

2,344,246

UNITED STATES PATENT OFFICE 2,344,246

MATERIAL DIGGING AND HANDLING APPARATUS

Stephen Grubich, Milwaukee, Wis.

Application April 22, 1942, Serial No. 439,979

20 Claims. (Cl. 214—100)

This invention relates to improvements in an apparatus for digging, removing and handling material and more particularly to mobile mounted power driven shovel, although certain features thereof may be employed with equal advantage for other purposes.

It contemplates more especially an automatic shovel for scooping up material in making excavations or transferring material from one position to another including the loading of trucks therewith for removal after the digging or scooping operations. It will be understood, however, that the principles of this invention may be employed in connection with the bulldozer, a blade plow and backfiller and various other apparatus for handling material which it is desired to transfer for short distances from one location to another.

In an apparatus of the character involved herein, the distribution of the weight of the shovel mechanism with or without its contents, affects the loading capacity of the machine. It is therefore an aim of the present invention to construct and locate the parts in a manner so that the apparatus is more or less in a balanced state during operation and does not require outrigger anchoring means which handicaps mobility and the full advantageous use thereof. It is desirable to unload the bucket or shovel quickly and without injurious effect upon the apparatus or the trucks into which the bucket is discharged, thereby procuring maximum capacity with minimum wear and tear on the instrumentalities.

One object of the present invention is to simplify the construction and improve the operation of devices of the character mentioned.

Another object is to provide an improved article digging and handling apparatus to secure an increased lifting capacity due to the distribution of the weight of the shovel mechanism so that in both scooping and unloading positions the weight of the mechanism will be behind the fulcrum while the remaining structure will act as a counter-weight.

Still another object is to provide novel lifting means for the digging bucket so that the initial bucket raising instrumentalities cooperate with a bucket traversing track without the aid of the initial lifters, thereby providing compact, balanced and rigid parts that are unusually effective in operation.

A further object is to provide means for moving the material digging and handling bucket both forward and backward relative to a dead center position at the dumping or discharge end of the track.

A still further object is to provide means to transfer the material digging and handling bucket from its initial lifting means to a track so that the parts may be compact, effective, and provide an unusually large capacity for any comparable size device.

Still a further object is to provide novel operating means for transferring the bucket from the initial lifters to and along the track with provision for the bucket traveling slower during the initial stage of its operating cycle than in traversing for conveyance to its discharge end, thereby utilizing the power load most advantageously.

An additional object is to provide mobile mounted digging and handling instrumentalities including a track conveyor that is adjustably mounted to provide for different digging angles relative to the support therefor.

Other objects and advantages will appear from the following description of an illustrative embodiment of the present invention.

In the drawings:

Figure 3 is a top plan view of my improved material handling apparatus.

Figure 4 is a fragmental view in detail of the ramp or track portion of the apparatus, looking towards the inside face of one of the tracks.

Figure 5 is a detail of the ramp and its frame, together with the lifting arms for the bucket shown detached from the mobile tractor portion of the structure, the bucket being shown in full lines in dumping position and in dotted lines at the position where it is leaving the lifting arms.

Figure 6 is a detail of the bucket detached from the apparatus looking at an end which is shown in elevation.

Figure 7 is a transverse section on line VII—VII of Figure 4, showing the bucket wheel and its mount in elevation and a portion of the tripping mechanism.

Figure 8 is a vertical side elevation of the bucket lifting arms, detached from the apparatus.

Figure 9 is an end elevation of the parts shown in Figure 8, looking at the same from the left hand side thereof.

Figure 10 is a section on line X—X on Figure 8 looking in the direction of the arrows.

Figure 11 is a bottom plan view of the bucket detached from the apparatus.

Figure 12 is a transverse section taken on line XII—XII of Figure 8, looking in the direction of the arrows and drawn to a larger scale.

Figure 13 is a broken away view showing portions of the bucket and the lifting member in section and showing the latching devices for attaching the bucket to the lifting member.

Figure 1:
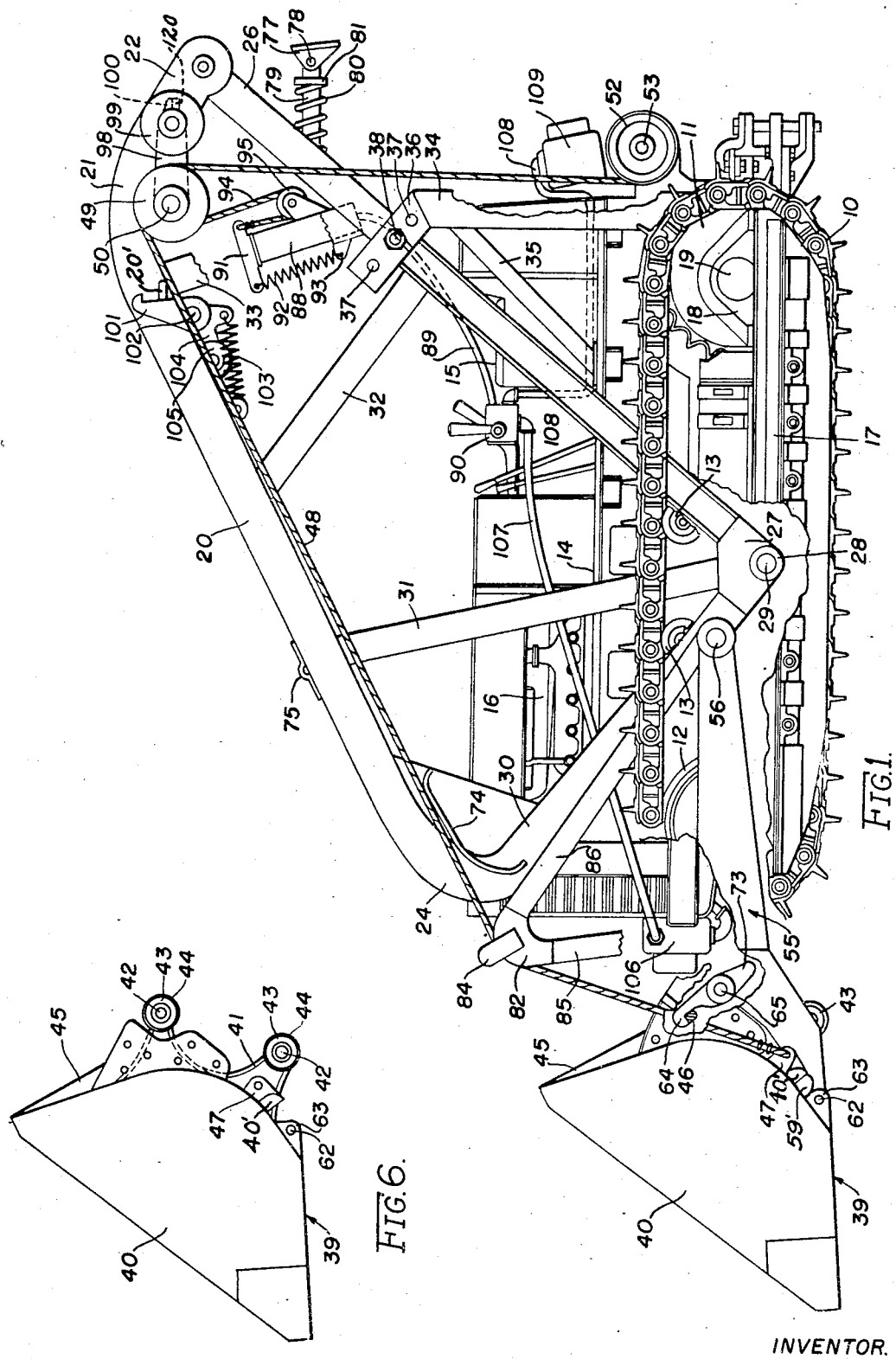
Figure 1 is a vertical side elevation of my improved material handling apparatus with certain portions broken away to clarify the disclosure.

The apparatus which I have devised is preferably mounted upon a mobile structure of the caterpillar type having the usual traction chain 10 that is driven by a power wheel 11 at one end of the chassis. The traction chain passes around a large roller 12 at the other end of the chassis and its upper reach is supported by intermediate small rollers 13. The body of the tractor is provided with a platform 14 upon which the power instrumentalities are mounted. At the rear of the platform there is a seat 15 for the operator, in front of which are suitable controls, which will later be described, and there is a motor or engine 16 of the liquid fuel type, preferably of the internal combustion type. In designating the front and rear ends of the apparatus, the end at the right in Figure 1, where the material is dumped is deemed the rear end and the end at the left in said figure where the bucket or shovel picks up the material to be handled is deemed the front end.

The tractor is usually provided with heavy angle iron side sills 17 that support bearing blocks 18 in which the trunnions 19 of the sprocket wheel 11 are journalled, similar bearing blocks or journals, not shown, being provided for the idle wheel 12 before mentioned.

The bucket, as has been hereinbefore stated, is adapted to travel during a portion of its cycle upon a track which guides it to its position for dumping at the rear end of the tractor. The track comprises longitudinally disposed channels 20 that are in parallel relation to each other with their flanges facing or extending inwardly, and said channels are preferably disposed in inclined planes such as shown in Figure 1 so that a ramp is provided thereby. At their upper ends the channels forming the tracks 20 have curved portions 21 that provide "humps" and terminate in tangent downwardly extended terminal portions 22 which latter, at their extremities, are provided with closed pockets shown in detail in Figure 4 to provide stops 23. The lower or other ends of the tracks have downwardly curved portions 24 and the upper flanges of the channels forming these tracks is cut away as at 25 in Figure 4 to permit implacement of the wheeled bucket on the ramp. Angle metal beams 26 extended obliquely downward from the rear ends of the tracks to corner plates 27 and the corner plates 27 have bearing bosses 28 for the pivots or trunnions 29 that project from the tractor side sills. Similar beams 30 extend downwardly from the lower front ends of the track rails and are united with the blocks 27. Suitable stays 31, 32 and 33 are connected to the triangular shaped structures just previously described and thus provide a rigid frame of the cantilever type which is disposed in the manner shown in Figure 1 and which is fulcrumed upon the trunnions 29. Vertical standards 34 arise from a suitable rear portion of the tractor and are braced by stay bars 35 as shown at the right hand of Figure 1. The upper ends of the standards have oblique portions 36 that are provided with a plurality of apertures 37 to receive the shanks of bolts 38, which bolts pass through aligned openings in the inclined frame members 26. By removing the nuts from the bolts 38 the track frame may be tilted upon its trunnions 29 to adjust the angularity or incline of the ramp members, and after the desired adjustment has been made the bolts are inserted through the aligned apertures in the oblique portion 36 of the standard and the inclined frame member 26 to secure the frame in position. This adjusts the entering position of the bucket.

The bucket comprises a hollow body 39 of elongated trough-shape having transverse end walls 40, and it is provided upon its under portion with elongated trucks 41—41 that are disposed transversely of the bucket body near the ends thereof and are provided with lateral stubs 42—42 upon which suitable wheels 43—43 are journalled. These wheels are adapted to support the bucket when it is travelling upon the ramp tracks 20, and said wheels are positioned on the tracks with their treads within the spaces between the flanges of channels 20 forming the tracks, while the annular flanges 44 of these wheels are disposed outside the flanges of the channels as shown in detail in Figure 7. The under portion of the body of the bucket is provided with two pairs of elongated shoes 45—45 that provide braces across the bottom of the bucket to add rigidity thereto, and the members of each pair are connected by tie-members 46—46. Suitable lugs 47—47 depend from the curved under surface of the bucket body, near the ends thereof and are preferably located adjacent and outside the planes of the elongated shoes 45. These lugs 47—47 are provided with suitable apertures and the ends of the pulling cables 48—48 are adjustably secured therein in any suitable manner. The cables pass upwardly in an oblique direction outside of and parallel to the tracks 20 of the ramp and at the top of the latter said cables pass over sheaves 49—49 that are rotatably mounted loose upon the adjacent extended ends of a rock shaft 50. The rock shaft 50 is journalled in members 51 depending from the "humps" or upper arcuate portions 21 of the tracks, and from the sheaves 49—49 the cables pass downwardly in a substantially vertical direction to windlasses 52—52 anchored upon the ends of a drive shaft 53. As will be seen in Figures 1 and 2, the drive shaft 53 is journalled in bearings 54—54, mounted upon the chassis of the tractor at or adjacent the rear end thereof and said shaft is driven by suitable power mechanism which will be later described.

After the bucket has been loaded, in the position shown in Figure 1, it is raised by lifter arms 55—55 in a curved path until the wheels 43 of the bucket pass into the channels of the ramp tracks 20. This entrance of the bucket wheels 43 takes place in front of the cutaway portion 25 of the upper channel flanges of the tracks. The lifter arms 55—55 comprise elongated members that are fulcrumed upon their rear ends on pins 56—56 and their outer movable end portions are provided with concave saddles 57—57 to receive the curved body portion of the bucket. As shown in detail in Figure 8 the arms are of a somewhat Y-shape, being formed with relatively short branches 58 and longer branches 59 and said longer branches are connected adjacent their outer ends by a transverse beam 60 that is of a triangular shape in cross section. Beyond the cross-bars 60 the longer branches 59 of the arms 55 are provided with open sockets 61 to receive cross-pins 62—62, each extending between two small lugs 63 projecting from the bottom of the bucket. It will be noted in Figures 8 and 13 that the sockets 61 are so shaped that the lower parts thereof project beyond the ends of the upper portions which will permit the clearing of the bucket from the arms and the saddles when the bucket has been lifted up to and positioned on the tracks.

Means are provided whereby the bucket may be temporarily or detachably connected to the respective arms. This structure comprises a latch-hook 64 fulcrumed upon a pivot 65 extending transversely across the short branches 58 of the arms and projecting out of the end thereof where it is adapted to engage with cross-pins 46 on the adjacent portions of the bucket. The latch-hooks 64 are automatically returned to their latching positions by means of spring elements 67 that are coiled around the projecting portions of the pivot pins 65 and have end portions 68 engaged with lateral members 69 on the latch-hooks, which lateral members ride in slots 70 in the wall of the branch 58. The other ends 71 of the springs are engaged with steps 72 projecting from the adjacent portions of the branches 58 of the arms. The pin 69 cooperating with the arcuate slot 70 limits the movement of the lever 64 in both directions (Figure 5). The ends of the pivot pins 65 project through the opposite walls of the branches 58 and are provided with trips 73. It will be understood that each arm 55 is provided with the latches and trip members just described.

When the windlasses 52 are rotated the cables 48 will pull the bucket upwardly with the arms 55 until the leading wheel on the bucket is engaged with the track and during a portion of this movement the trip members 73 will have engaged the respective cam pieces 74 projecting from the sides of the ramp frame adjacent the lower ends of the tracks. This releases the latch-hooks 64—64 from the pins 66—66 on the bucket and the bucket will leave the saddles at the ends of the arms 55 and said arms will continue their arcuate movement until the cross-piece 60, which connects the arms, engages a spring stop 75 that is disposed transversely across the ramp. In this latter position the pins 62 on the bucket will have reached a position with respect to the sockets 61 in the ends of the longer branches 59 so that said pins will move out of said sockets while the cables continue to pull the bucket up the ramp. This stage in the cycle of operation is shown in dotted lines in Figure 5. Lugs 48' on the bottom of the bucket engaged with stop members 59' on the branches 59 of the lifter arms 55, prevent the bucket 39 from sliding out of the saddles 57 while it is being elevated to and placed upon the tracks or ramp 20.

The cables will continue to pull the bucket upwardly over the hump or curved portion 21 of the ramp, and the leading wheels of the bucket pass down reversely inclined extensions 22 of the ramps or tracks and enter the terminal portions or seats 23 thereof. In this position the leading wheels of the bucket are adapted to act as pivots and the weight of the bucket is to the rear of the leading wheels which allows the bucket to up-end itself. In performing this movement the rear or trailing wheels of the bucket pass through cutaway or notched out portions 76 in the upper flanges of the rails or tracks. In the downward swing of the bucket to the dumping position shown in full lines in Figure 5, the braces or ribs 45 on the body of the bucket are adapted to engage shoes 77—77 that are pivotally mounted as at 78 on the ends of horizontal plungers 79 suitably carried upon the ramp frame preferably by the oblique channel members 26. The said plungers are surrounded by springs 80 between collars 81 and the members in which the plungers are mounted to urge the plungers outwardly. This tends to cushion the impact resulting from the sudden stoppage of the bucket in its dumping action. This cushioning will permit the operator to allow the bucket to tip suddenly and thereby dislodge and shake out sticky substances which may tend to adhere to the walls of the bucket. As the bucket tilts backward to unload its contents it has only a limited supply of slack cable. This will allow the bucket to dump only a portion of its load. The balance of the load will be dumped as required, under the control of the operator, by his use of the friction clutch in allowing the bucket to dump freely, or slowly as desired.

The arms are provided with cable engaging or guide yokes, each of which comprises a corner member 82 having a guide channel 83 in its edge and having outwardly flared lips 84 as shown in Figure 10. These cable engaging guide yokes are preferably spaced from the arms by means of stays 85 and 86. The stay 85, as shown in Figure 8, extends from the corner member 82 downwardly to and is suitably secured to the bucket lifting arm 55 in any suitable manner. The other stay 86 is obliquely disposed and extends from the corner member downwardly to the bearing boss at the rear end of the arm 55. The arm 55 and the stays 85 and 86, together with the corner member 82, provide a triangular shaped frame which constitutes a bell-crank lever of relatively large proportions and as seen in Figure 1 the cable 48 engages in the grooves of the corner members of these bell-cranks at a location between the sheaves 49 and the cable attaching lugs 47 on the bucket. This arrangement tends to assist in the lifting movement of the arms when moving the bucket upwardly from its loading position, at the left in Figure 1, to a position where the cable will be withdrawn from the yoke to provide a straight run of cable from the bucket direct to the sheaves 49.

Figure 2:
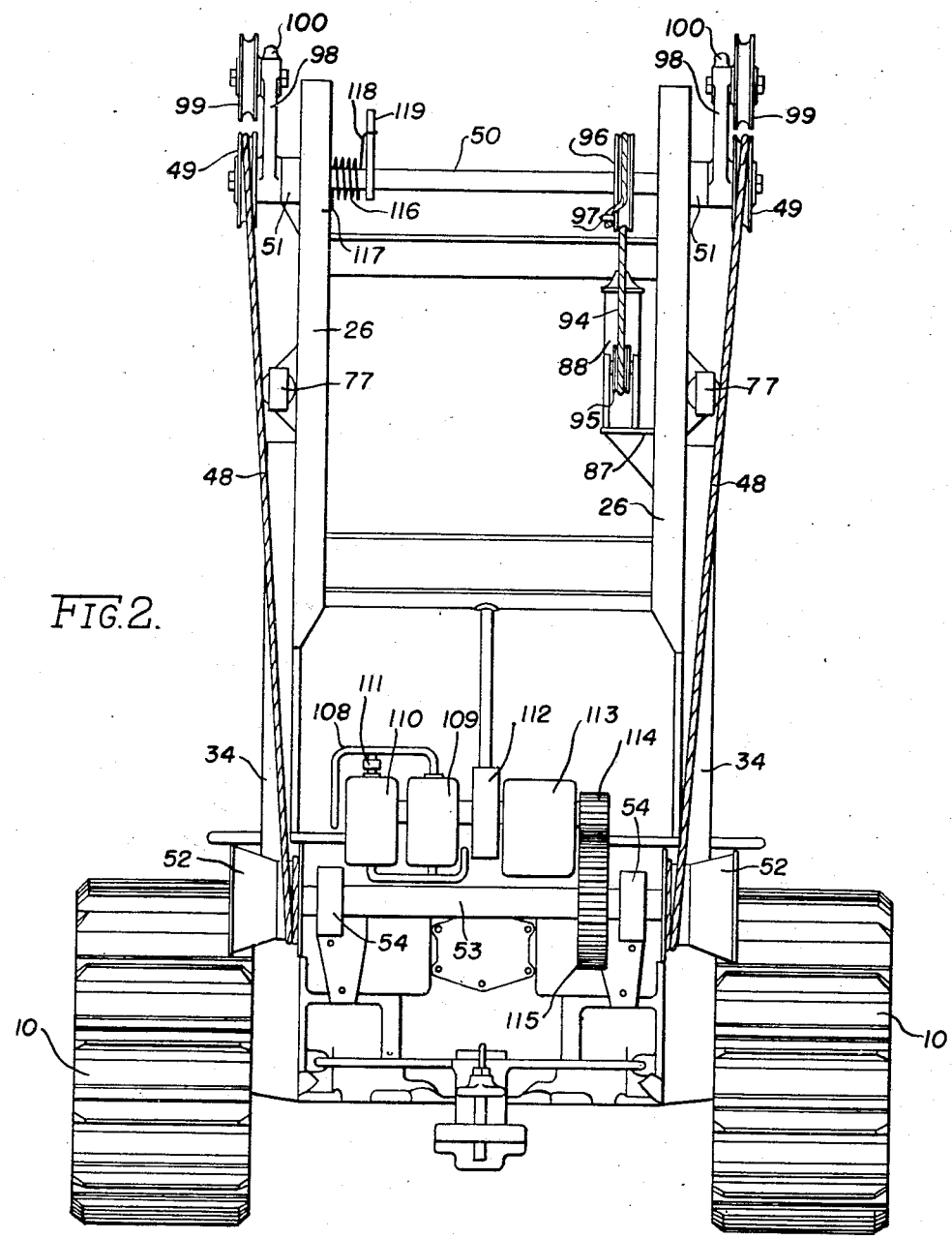
Figure 2 is a vertical end elevation of the apparatus shown in Figure 1, looking at the rear or dumping end thereof.

One of the structural members of the track frame is provided with a shelf 87 upon which the cylinder 88 of a hydraulic operated jack is mounted. The piston of this jack is moved outwardly by a suitable pressure fluid that is fed to the bottom of the cylinder through a pipe 89, which pipe leads from a control box 90 located convenient to the operator. The plunger or piston of the jack carries a cross-bar 91 upon its outer end and there is a tension spring 92 that is connected to the cross-piece at one end while its other end is connected to a fixed lug 93 so that the tendency of the spring is to urge the plunger downwardly in the cylinder. The cross-piece is connected to a relatively short cable 94 that passes down under a small pulley 95 journalled upon the shelf 87 as shown in Figure 2 and said cable 94 then passes upwardly and partly around a sheave 96 that is secured fast upon the rock shaft 50 upon which the sheaves 49 are loosely mounted. The adjacent end of the cable 94 is anchored as at 97 to the sheave 96.

Suitable lever-arms 98 are secured fast upon the extended ends of rock-shaft 50 between the bearings 51 of said shaft and the loose sheaves 49, and the free ends of these lever-arms are provided with cross-pins for rotatably mounting idle sheaves 99. The normal positions of these parts when the bucket has reached the end portion of the ramp are shown at the right in Figure 5. In these positions the cables 48 which have pulled the bucket up the ramp and over the hump thereof have moved from the sheaves 49 to the sheaves 99 and the bucket has become up-ended and dumped. In order to start the reverse movement of the bucket the operator admits compressed fluid to the cylinder 88 of the jack thereby gradually forcing the plunger outwardly and creating a pull upon the short cable 94 which, due to its anchorage upon the sheave 96 will rock the shaft 50 contra-clockwise and swing the lever arms from their normally horizontal position to the right of the rock shaft to an opposite position as shown in dotted lines which is to the left of the rock shaft in Figure 5. In this position the bucket pulling cables will have returned to the sheaves 49 and suitable lugs 100 on the ends of the lever arms 98 will have become engaged with latch-hooks 101. These latch-hooks are mounted upon pivots 102 that are carried in any suitable manner upon the lower flanges of the tracks 20 and said hooks 101 are maintained in the locking position as shown by means of a spring 103 that is connected to a suitable bell-crank member 104 that is carried by the pivots 102 of the latch-hooks. When the bucket moves down the ramp, the operator may then regulate the return movement of the bucket by controlling the speed of rotation of the windlasses 52 through a clutch mechanism and the bucket will gravitate down the ramp and again engage with the lifting arms which will thereupon assist in returning the bucket to a loading position after being latched to said arms.

The bell-crank member 104 carries upon one of its arms a roller 105 which is in a position to be engaged by wheel trucks 41 upon the bucket and this engagement causes a rocking of the bell-crank thereby moving the latch-hook 101 away from the lug 104 on the lever arms and permits the latter to swing back in a clockwise direction to a normal position which is shown by the full lines of Figures 1 and 2.

The power devices of this apparatus may be of any desired type and, for the purpose of illustration, there is shown the hydraulic pump 106 at the front end of the tractor and adapted to be actuated by the motor 16 in any suitable manner. Pipe lines 107 lead to the control box 90 hereinbefore mentioned, and pipe lines 108 lead from the control box to the hydraulic motor 109 which is connected in tandem with a similar motor 110, while an automatic valve 111 controls the hydraulic motor 110 through the medium of a bleeder in the main line 108 leading to the motor 109. This valve is adapted to open at a predetermined pressure and allows the hydraulic fluid to actuate the motors 110 and 109. Thus the power on the windlasses 52 may be doubled while the speed of the windlasses is reduced practically one-half. There is an inclosed clutch 112 on the motor shaft and alongside this clutch there is a gear reduction mechanism 113 (the details of which need not be shown) and the reduced speed shaft of this gear mechanism projects out of the casing and has a pinion 114 secured to it that meshes with a large gear 115 that is fast upon the shaft 53 which drives the windlasses 52.

A coiled spring 116 which surrounds rock-shaft 50 has one end 117 suitably secured to the ramp frame and has its other end 118 engaged with a lateral member 119 that is secured to the rock-shaft so that the latter is normally urged in a direction to urge the lugs 100 on the ends of lever arms 98 to engage stops 120 on the rear portions of the tracks 20. In this manner the sheaves 99 may be returned to their normal positions as shown in Figures 1 and 5.

After the bucket has been dumped, the operator will admit pressure fluid to the cylinder 88 of the jack to force the piston and its cross-member 71 outwardly against the pull of spring 92 and such movement will pull the short cable 94 and rotate the sheave 96 thereby rocking the rock-shaft 50 which in turn will swing the lever arms 96 contra-clockwise. Since the bucket moving cables 48 are taut around the sheaves 98 between the bucket and the windlasses 52, this swing of the lever-arms 98 will pull the bucket back from its dumping position thereby restoring the released bucket wheels to the track and moving the bucket a suitable distance forwardly beyond the humps 21 of the tracks so that said bucket may be gravitated down the ramp by releasing the clutch to permit free rotation of the windlasses 52.

Stops 101' maintain the latch-hooks 101 in position (Figure 1) to be engaged by lugs 100 at the ends of the rocker-arms 98 when the bucket 39 is moved back from its tilted position onto the hump 21 of the ramp 20. When the bucket 39 is released to gravitate down the ramp 20, the ends 41' of the wheel trucks 41 will contact the rollers 105 to depress them and rock the bell-cranks 104 in a counter-clockwise direction (viewed from Figure 1). This will actuate the latch-hooks 101 to release them from the lugs 100 so that the rocker-arms 98 responding to the urge of spring 116 will be restored to their normal positions until after the succeeding dumping of the bucket 39.

Upon reaching the arms 55 as shown in dotted lines in Figure 5, the pins 62 will enter the sockets 61 and the arms will begin their return swing downwardly to their initial or loading positions and the bucket will become seated in the saddles 57 at the free ends of the arms. When the bucket is passing the cam plates 74 the trip will release the latch-hooks 64 so that said hooks will engage with the cross-pins 66 thereby locking the arms to the bucket.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

What I claim is:

1. A material handling apparatus embodying a runway; a support therefor; a bucket adapted to traverse said runway during a portion of its cycle of operation; actuating means adapted to move said bucket in its aforesaid cycle; rigid arm means engageable with said bucket and operable responsive to said actuating means for lifting said bucket and guiding it to and from said runway; and devices for disengaging said lifting means from the bucket during the travel of said bucket on said runway.

2. A material handling apparatus embodying a runway; a support therefor; a bucket adapted to traverse said runway during a portion of its cycle of operation; actuating means adapted to move said bucket in its aforesaid cycle; fulcrumed reciprocable rigid arm means engageable with said bucket and operable responsive to said actuating means for lifting said bucket and guiding it to and from said runway; and devices for disengaging said fulcrumed means from the bucket during the travel of said bucket on said runway.

3. A material handling apparatus embodying a runway; a support therefor; a bucket adapted to traverse said runway during a portion of its cycle of operation; actuating means adapted to move said bucket in its aforesaid cycle; rigid arms fulcrumed on said support and movable responsive to said actuating means, the free portions of said arms adapted to lift said bucket and guide it to and from said runway; and devices for disengaging said arms from the bucket during the travel of said bucket on said runway.

4. A material handling apparatus embodying a runway; a support therefor; a bucket adapted to traverse said runway during a portion of its cycle of operation; actuating means adapted to move said bucket in its aforesaid cycle; rigid arms fulcrumed on said support below said runway and movable responsive to said actuating means, said arms adapted to lift said bucket and guide it to and from said runway; latching devices detachably connecting said arms to said bucket; and means for releasing said latching devices whereby said arms are detached from the bucket during the travel of said bucket on said runway.

5. A material handling apparatus embodying a runway; a support therefor; a bucket adapted to traverse said runway during a portion of its cycle of operation; a cable connected to said bucket and adapted to move said bucket in its aforesaid cycle; power devices for moving said cable; rigid arm means engageable with said bucket and operable responsive to the movement of said cable for lifting said bucket and guiding it to and from said runway; and devices for disengaging said lifting means from the bucket during the travel of said bucket on said runway.

6. A material handling apparatus embodying a runway; a support therefor; a bucket adapted to traverse said runway during a portion of its cycle of operation; a cable connected to said bucket and adapted to move said bucket in its aforesaid cycle; power devices for moving said cable; fulcrumed reciprocable rigid arm means engageable with said bucket and operable responsive to the movement of said cable for lifting said bucket and guiding it to and from said runway; and devices for disengaging said fulcrumed lifting means from the bucket during the travel of said bucket on said runway.

7. A material handling apparatus embodying a runway; a support therefor; a bucket adapted to traverse said runway during a portion of its cycle of operation; a cable connected to said bucket and adapted to move said bucket in its aforesaid cycle; power devices for moving said cable; rigid arms fulcrumed on said support and movable responsive to the movement of said cable, said arms adapted to lift said bucket and guide it to and from said runway; and devices for disengaging said arms from the bucket during the travel of said bucket on said runway.

8. A material handling apparatus embodying a runway; a support therefor; a bucket adapted to traverse said runway during a portion of its cycle of operation; a cable connected to and adapted to move said bucket in its aforesaid cycle; a windlass for moving said cable; power devices for rotating said windlass; rigid arms fulcrumed on said support and responsive to the movement of said cable, said arms adapted to lift said bucket and guide it to and from said runway; latches for detachably connecting said arms to said bucket; and devices for operating said latches to disengage said arms from the bucket during the travel of said bucket on said runway.

9. A material handling apparatus embodying a support; a runway thereon; a bucket adapted to traverse said runway during a portion of its cycle of operation; cables connected to and adapted to move said bucket in its aforesaid cycle; rigid arms fulcrumed on said support; saddles at the free ends of said arms adapted for detachable connection with said bucket; said arms movable responsive to the movement of said cables and thereby adapted for guiding said bucket to and from said runway; power means for winding and unwinding said cable; means on said saddles providing attachment to said bucket; and means on said runway operating said attaching means for disengaging said saddles from the bucket during the travel of said bucket on said runway.

10. A material handling apparatus embodying a support; spaced tracks providing a ramp thereon; a material digging and carrying bucket; wheels on said bucket adapted for operation on said tracks during the cycle of operation of said bucket on said support; actuating means adapted to move said bucket to and along said ramp; fulcrumed rigid arm means operable responsive to said actuating means for guiding the bucket to siad tracks; and devices for disengaging said fulcrumed means from the bucket during the travel of said bucket on said tracks.

11. A material handling apparatus embodying a support; spaced tracks providing a ramp thereon; a material digging and carrying bucket; wheels on said bucket adapted for operation on said tracks during the cycle of operation of said bucket on said support; cables connected to said bucket; actuating means for moving said cables to pull said bucket up said ramp; fulcrumed rigid arm means operable responsive to said actuating means for transferring said bucket from a loading position to said tracks; and devices for disengaging said fulcrumed means from the bucket when said bucket reaches said tracks.

12. A material handling apparatus embodying a support; spaced tracks providing a ramp thereon; a material digging and carrying bucket provided with wheels adapted for operation upon said ramp during the movement of said bucket up and down said ramp; actuating means adapted to move said bucket in its cycle of operation; rigid lifter arms fulcrumed on said support for guiding the bucket from loading position to said ramp, and devices for disengaging said lifter arms from the bucket during the travel of said bucket upon said ramp.

13. A material handling apparatus embodying a runway; a support therefor; a material digging and carrying bucket provided with wheels adapted for operation upon said runway during a portion of the cycle of operation of said bucket; means adapted to bodily move said bucket from its loading to its unloading positions; rigid arm bucket lifting means operable responsive to said bucket moving means for lifting said bucket from its loading position to said runway; and devices for disengaging said bucket lifting means from the bucket during the travel of said bucket on said runway.

14. A material handling apparatus embodying an inclined ramp; a material digging and carrying bucket adapted to traverse said ramp; a cable for moving said bucket up said ramp; a sheave at the upper portion of said ramp with which said cable is engaged during upward movement of said bucket; a rock-shaft; means adjacent said rock-shaft adapted to tilt said bucket; a second sheave bodily movable with said rock-shaft and adapted to be engaged by said cable upon the tilting of said bucket; and means for rotating said rock-shaft to bodily move said second sheave while it is engaged with said cable and thereby restore said bucket to a non-tilted position.

15. A material handling apparatus embodying an inclined ramp; a material digging and carrying bucket adapted to traverse said ramp; a cable for moving said bucket up said ramp; a sheave at the upper portion of said ramp with which said cable is engaged during upward movement of said bucket; a rock-shaft; means adjacent said rock-shaft adapted to tilt said bucket; a lever-arm fixed to said rock-shaft; a second sheave journalled on said lever-arm in a position to be engaged by said cable upon the tilting of said bucket; and means for rotating said rock-shaft to actuate said lever-arm and bodily move said second sheave while it is engaged with said cable and thereby restore said bucket to a non-tilted position.

16. A material handling apparatus embodying an inclined ramp; a material digging and carrying bucket adapted to traverse said ramp; a cable for moving said bucket up said ramp; a sheave at the upper portion of said ramp with which said cable is engaged during upward movement of said bucket; a rock-shaft; a downwardly inclined track at the upper end of said ramp adapted to receive and tilt said bucket; a second sheave bodily movable with said rock-shaft and adapted to be engaged by said cable upon the tilting of said bucket; and means for rotating said rock-shaft to bodily move said second sheave while it is engaged with said cable and thereby return said bucket to said ramp from said track.

17. A material handling apparatus embodying an inclined ramp; a material digging and carrying bucket adapted to traverse said ramp; a cable for moving said bucket up said ramp; a sheave at the upper portion of said ramp with which said cable is engaged during upward movement of said bucket; a rock-shaft on which said sheave rotates; a downwardly inclined track at the upper end of said ramp adapted to receive and tilt said bucket; a lever-arm fixed to said rock-shaft and movable therewith; a second sheave journalled on said lever-arm and bodily movable therewith, said second sheave adapted to be engaged by said cable upon the tilting of said bucket; and means for rotating said rock-shaft to bodily move said lever-arm and said second sheave while the latter is engaged with said cable and thereby move said bucket from said track to said ramp.

18. A material handling apparatus embodying an inclined ramp; a material digging and carrying bucket adapted to traverse said ramp; means at the upper end of said ramp adapted to tilt said bucket; means for moving said bucket on said ramp; a rocker-arm fulcrumed at the upper portion of said ramp; a sheave rotatably carried by the movable portion of said arm, said sheave adapted to be engaged by a portion of the bucket-moving means when said bucket is engaged with said tilting means; a cable having at one end an operative connection with said rocker-arm; and reciprocable power actuated means having connection with another portion of said cable for moving the latter, the movement of said cable through the medium of said power means adapted to rock said arm to shift said bucket away from said bucket tilting means.

19. A material handling apparatus embodying an inclined ramp; a material digging and carrying bucket adapted to traverse said ramp; a downwardly inclined track at the upper end of said ramp adapted to tilt said bucket; an elongated cable for moving said bucket on said ramp; a rocker-arm fulcrumed at the upper portion of said ramp; a sheave rotatably carried by the movable portion of said arm, said sheave adapted to be engaged by a portion of said elongate cable when said bucket is disposed on said downwardly inclined track; a short cable having at one end an operative connection with said rocker-arm; and reciprocable power actuated means having connection with another portion of said second mentioned short cable for moving the latter, the movement of said short cable through the medium of said power means adapted to rock said arm to remove said bucket from said downwardly inclined track and return said bucket to said ramp.

20. In a material handling apparatus the combination with a vehicle frame; a ramp thereon; a support for said ramp fulcrumed on said vehicle frame; material penetrating and conveying means movable on said ramp; means for displacing said last named means between said support and said ramp and therealong, and means for fixedly adjusting said ramp support with respect to said vehicle frame to vary the penetrating position of the material penetrating and conveying means depending upon the position of said vehicle frame to accomplish the most effective digging movement of said penetrating means.

STEPHEN GRUBICH.